Aug. 30, 1966 K. DINTER 3,270,131
TELEVISION RECEIVER AND VIDEO SIGNAL GENERATOR
CONNECTIBLE FOR USE THEREWITH
Filed Jan. 25, 1963

INVENTOR
Konrad Dinter
BY Spencer & Kaye
ATTORNEYS

United States Patent Office 3,270,131 Patented August 30, 1966

3,270,131

TELEVISION RECEIVER AND VIDEO SIGNAL GENERATOR CONNECTIBLE FOR USE THEREWITH

Konrad Dinter, Ulm (Danube), Germany, assignor to Telefunken Patentverwertungs-G.m.b.H., Ulm (Danube), Germany Filed Jan. 25, 1963, Ser. No. 253,906
Claims priority, application Germany, Jan. 26, 1962, T 21,485
15 Claims. (Cl. 178—6.8)

The present invention relates to a non-grounded connection of a video signal generator to a television receiver, wherein the receiver and/or signal generator are adapted to be connected to either a D.C. or an A.C. power supply.

Because of the large number of tubes, and also because of the stray magnetic fields which are due to the transformers incorporated in television sets, most of the ordinary television receivers which are connectable to either a D.C. or an A.C. power supply, have one "grounded" terminal, i.e., one terminal or pole of the power supply is connected with the receiver chassis so as to be grounded with respect to the receiver. This produces the well known difficulties insofar as "true" grounding, i.e., grounding with respect to earth, and protection against electric shocks are concerned, if there is to be an additional video signal input which can be used, for instance, for playing back a tape recording of a previously received television program, or for connecting an electronic slide projector or moving film strip to the television set so that the pictures may be reproduced on the screen thereof. (Such apparatus will hereinafter be referred to simply as video signal generators.)

Because of the frequency of the signal passing through the additional video input (between 1 kilocycle and 5 megacycles), at least the neutral conductor has to be a galvanic connection, or a connection via a relatively large capacitor, between the receiver and the signal generator. If, then, the television receiver and the video signal generator are so connected to the power supply that their respective chassis are, in fact, connected to two different terminals of the power supply, and if the signal generator is then connected to the receiver, a galvanic connection will, of course, produce a short circuit. Even if the receiver chassis and the signal generator chassis happen to be connected to the same terminal of the power supply, so-called earth or stray currents can still give rise to some humming. In either case, the person connecting the two components to each other can receive a severe electric shock. If, instead of a straight galvanic connection, the neutral conductor includes a high capacitance so as to produce a low-frequency connection between the receiver and the signal generator, this will cause very substantial hum voltages.

It will be seen from the above that if the television receiver and the external video signal generator are to be connected to each other in such a manner as to avoid the above-mentioned drawbacks, the only way in which this can be done satisfactorily is if the chassis of both the receiver and the video signal generator are connected to the same pole of the power supply, and if this common pole is grounded with respect to earth. This, however, can never be guaranteed because, in practice, the power line of the receiver and the signal generator are plugged in arbitrarily into a conventional wall socket, i.e., the user will ordinarily simply plug in the two components without paying any attention as to which prong is connected to the grounded lead. Moreover, there exist power supply systems in which each of the two poles have a certain potential, e.g., 100 v., with respect to true ground, in which case even the giving of due consideration to the polarity of the connector prongs will be useless.

It is, therefore, an object of the present invention to provide a circuit arrangement which overcomes the above disadvantages, and, with this basic object in view, the video signal of the signal generator is, according to the present invention, modulated onto a carrier and is applied, via a nongalvanic connection, to the receiver at a point ahead of the video rectifier. The frequency of the carrier is preferably equal to the standardized IF (intermediate frequency) of the receiver because this makes it possible to dispense with several circuit elements and to use the IF amplifier, or a portion thereof, for amplifying the video signal put out by the signal generator.

According to one embodiment of the present invention, the signal which is modulated onto the carrier is applied to the input of the last stage of the IF amplifier, for example to the screen grid of this tube, because the pass-through characteristic of the latter is selected for receiving the residual side band so that the frequency response will be affected only in the last stage. In order to compensate for the distorting of the frequency response due to the pass-through characteristics of the IF amplifier, the line carrying the signal produced by the signal generator may incorporate frequency correcting elements which predistort the signal in an appropriate manner. If the signal coming from the signal generator does not have to be amplified, the carrier can just as well have a different frequency, in which case the signal which is carried by the carrier is applied to the input of the video amplifier.

Alternatively, the signal put out by the signal generator can be applied to the input of a separate video rectifier and the input of the video amplifier can be switched to the output of either video rectifier, as desired, so that the television set can be made to play an ordinary television signal coming from a broadcast station or to play back a signal emanating from the video signal generator attached to the set.

A very substantial advantage of the present invention is that, due to the high frequency and hence reduced relative bandwidth, the input can occur via a high-frequency transformer or small capacitances, as a result of which both the television receiver and the separate video signal generator can be subjected to low-frequency decoupling, thereby avoiding the above-described drawbacks and dangers.

Additional objects and advantages of the present invention will become apparent upon consideration of the following description when taken in conjunction with the accompanying drawings in which.

Figure 1:
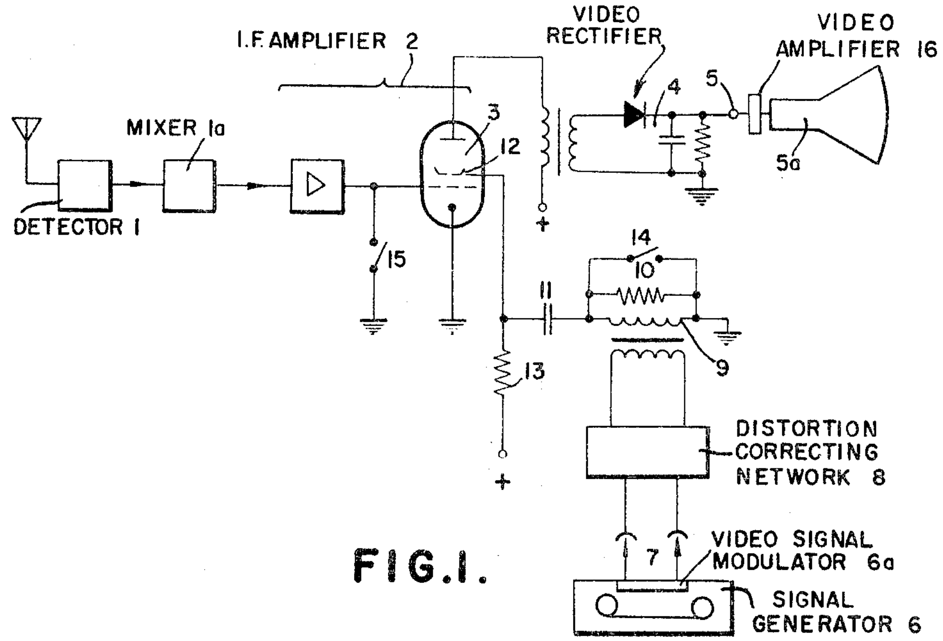
FIGURE 1 is a circuit diagram of one embodiment of a circuit arrangement according to the present invention.

Referring now to the drawings and to FIGURE 1 thereof in particular, the same shows means for receiving a broadcast video signal, which means include the conventional detector and mixer stages, 1, 1*a*, of a televsision receiver. The mixer stage, upon reception of a broadcast television signal, forms the IF signal, the latter being applied to an IF amplifier 2. The last stage of this IF amplifier is constituted by an amplifier tube 3, the anode of this tube 3 being connected, in conventional manner, to a video rectifier 4 at whose output 5 there appears the video signal for controlling the picture tube 5*a* via a video amplifier 16.

In the instant embodiment, the video signal generator is constituted by a magnetic scanning unit 6 which plays back a suitable record carrier, such as a tape, on which the picture is stored in magnetic form. The unit 6 includes a video signal modulator 6*a* which modulates the video signal onto a carrier and the modulated carrier of the signal generator is applied, via video signal input terminals 7 and a distortion correcting network 8, to the primary winding of a disconnect transformer 9 which is tuned to the frequency of the carrier and has a band width corresponding to the band width of the video signal. For this purpose, the secondary winding of the transformer has connected across it a damping resistor 10. The video signal passes through the secondary winding of the transformer and from there, via a capacitor 11, to the screen grid 12 of the last IF amplifier tube 3. The screen grid is conencted, via a resistor 13, with the necessary D.C. voltage, indicated by a plus sign. A switch 14 is connected in parallel with the secondary winding of the transformer 9, and another switch 15 is provided for grounding the control grid of the tube 3.

When the television set is to receive an incoming broadcast signal, the switch 15 is open and the switch 14 is closed. In this way, the screen grid 12 of tube 3 is grounded, insofar as the IF is concerned, via the capacitor 11, the latter having a capacitance which is sufficiently high so as to be, for all practical purposes, a short circuit for the intermediate frequency. Any voltages which appear at the terminals 7 will, irrespective of their frequencies, have no effect on the circuit.

When the television set is to receive its video signal from the signal generator constituted by the reproducing apparatus 6, the switch 15 is closed and the switch 14 open. The tube 3 and the video rectifier 4 now respond to the video signal coming from the signal generator, so that the signal 5 appearing at the output of the video rectifier 4 will now be that determined by the information stored on the record carrier played on the apparatus 6.

The switches 14 and 15 may be ganged so that at any one time one of the two switches will be open while the other is closed.

Figure 2:
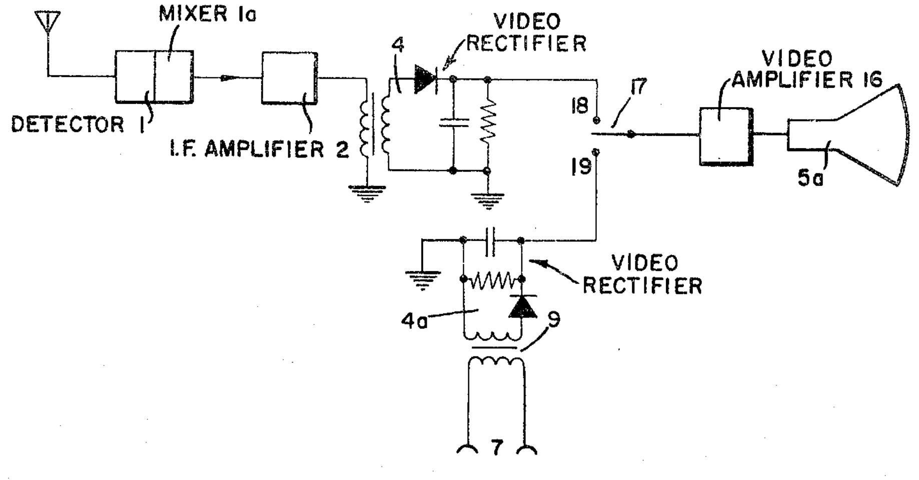
FIGURE 2 is a circuit diagram of another embodiment of a circuit arrangement according to the present invention.

FIGURE 2 shows a modified embodiment of the above-described circuit, the same component parts being indicated by the same reference numerals. In the instant embodiment, the signal applied to terminals 7 and passing the disconnect transformer 9 is applied to a separate video rectifier 4*a*. The input of a video amplifier 16 can, by means of a selector switch 17, be connected either to the channel 18, representing the output of the video rectifier 4 through which come video signals representing a broadcast transmission, or to the channel 19, representing the output of the video rectifier 4*a*, through which comes the output of the signal generator (not shown in FIGURE 2) which is connected to the television receiver.

It will be understood that the above description of the present invention is susceptible to various modifications, changes, and adaptations, and the same are intended to be comprehended within the meaning and range of equivalents of the appended claims.

What is claimed is:

1. A circuit arrangement comprising, in combination:

(a) a video signal generator incorporating means for modulating the video signal onto a carrier;

(b) a television receiver having a picture tube, video rectifier means for receiving a broadcast video signal, said receiving means including an IF circuit having a multiple stage IF amplifier whose last stage is connected to said video rectifier means, at least one of said components (a) and (b) being a component having a chassis which serves as a "ground" to which one terminal of a power supply is connected; and (c) reactive coupling means for establishing a non-grounded connection between the output of said modulating means of said signal generator and said receiver, said coupling means being connected to said receiver at a point thereof which is no further from said picture tube than said last stage of said IF amplifier, whereby said television receiver is capable of receiving a broadcast video signal when said television receiver is disconnected from and used independently of said video signal generator.

2. A circuit arrangement is defined in claim 1 wherein said coupling means comprise a transformer.

3. A circuit arrangement as defined in claim 2 wherein said transformer is tuned to the frequency of said carrier, the band width of said transformer corresponding to the band width of the video signal.

4. A circuit arrangement is defined in claim 1 wherein said carrier onto which the video signal generated by said signal generator is modulated has a frequency equal to that of the IF.

5. A circuit arrangement as defined in claim 4 wherein said video signal modulated carrier is applied to said last stage of said IF amplifier.

6. A circuit arrangement as defined in claim 5 wherein said coupling means further include a network for predistorting the video signal modulated carrier, thereby to compensate for distortions to which the carrier will be subjected by said last stage of said IF amplifier.

7. A circuit arrangement as defined in claim 5 wherein said last stage of said IF amplifier incorporates an electron tube having a screen grid, the latter constituting the input to which said carrier is applied.

8. A circuit arrangement as defined in claim 1 wherein said video signal modulated carrier is applied directly to said video rectifier means.

9. A circuit arrangement as definid in claim 1 wherein said viedo rectifier means comprises a single video rectifier, and wherein said television receiver further comprises means for receiving a broadcast video signal and switch means for selectively connecting said single video rectifier either to said broadcast receiving means or to said output of said modulating means of said signal generator, as desired.

10. A circuit arrangement as defined in claim 9 wherein said switch means comprises a first switch for short-circuiting the output of said broadcast receiving means, a second switch for short-circuiting the output of said modulating means of said signal generator, and means for closing said first switch while said second switch is open, and vice versa, as desired.

11. A circuit arrangement as defined in claim 1 wherein said television receiver further comprises means for receiving broadcast video signals, wherein said video rectifier means comprise a first rectifier connected to the output of said broadcast receiving means and a second rectifier connected to the output of said modulating means of said signal generator, and wherein said television receiver also comprises switch means for selectively connecting the output of either of said video rectifiers to a picture tube, as desired.

12. A circuit arrangement comprising, in combination:

(a) means for receiving a broadcast video signal;

(b) a multiple-stage IF amplifier connected to the output of said receiving means, the last stage of said amplifier comprising an electron tube;

(c) a video rectifier connected to the output of said electron tube;

(d) a picture tube connected to the output of said video rectifier;

(e) a transformer having primary and secondary windings, said secondary winding of said transformer being coupled, via a capacitor, to an input of said electron tube;

(f) a distortion correcting network having its output connected to said primary winding of said transformer;

(g) video signal input terminals connected to the input of said distortion correcting network;

(h) a signal generator having means for modulating the video signal into a carrier, the output of said modulating means being connected to said video signal input terminals;

(i) selectively operable first switch means for short-circuiting the input to said tube coming from the preceding stage of said multiple-stage IF amplifier; and (j) selectively operable second switch means for short-circuiting said secondary winding of said transformer.

13. A circuit arrangement comprising, in combination:

(a) means for receiving a broadcast video signal;

(b) a first transformer having primary and secondary windings, said primary winding being connected to the output of said receiving means;

(c) a first video rectifier having its input connected to said secondary winding;

(d) a video signal generator having means for modulating the video signal onto a carrier;

(e) carrier signal input terminals connected to the output of said modulating means;

(f) a second transformer having primary and secondary windings, said last-mentioned primary winding being connected to said carrier signal input terminals;

(g) a second video rectifier having its input connected to said last-mentioned secondary winding;

(h) a picture tube; and (i) switch means for selectively connecting said picture tube to the output of either of said video rectifiers.

14. A circuit arrangement as defined in claim 1 wherein said reactive coupling means are non-galvanic.

15. A circuit arrangement as defined in claim 1 wherein said reactive coupling means comprise capacitor means.

References Cited by the Examiner

UNITED STATES PATENTS

| | | | |
|---|---|---|---|
| 2,353,631 | 7/1944 | Bliss | 178—6.6 |
| 2,411,853 | 12/1946 | Finch | 178—6 |
| 2,906,815 | 9/1959 | Gargini | 178—6 |
| 2,965,708 | 12/1960 | Witt | 178—6.6 |

FOREIGN PATENTS

| | | |
|---|---|---|
| 150,155 | 2/1953 | Australia. |

OTHER REFERENCES

Hickman, R. E. B.: Magnetic Recording Handbook, TK5981H5 (1958).

DAVID G. REDINBAUGH, *Primary Examiner.*

T. G. KEOUGH, J. A. ORSINO, *Assistant Examiner.*